US011669354B2

(12) United States Patent
Yan et al.

(10) Patent No.: US 11,669,354 B2
(45) Date of Patent: Jun. 6, 2023

(54) TRANSFORMING ASSET OPERATION VIDEO TO AUGMENTED REALITY GUIDANCE MODEL

(71) Applicant: INTERNATIONAL BUSINESS MACHINES CORPORATION, Armonk, NY (US)

(72) Inventors: Zhe Yan, Beijing (CN); Li Li Guan, Beijing (CN); Hao Jia Li, Beijing (CN); Rong Zhao, Beijing (CN); Li Bo Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/816,107

(22) Filed: Jul. 29, 2022

(65) Prior Publication Data
US 2022/0382570 A1 Dec. 1, 2022

Related U.S. Application Data

(63) Continuation of application No. 17/333,442, filed on May 28, 2021.

(51) Int. Cl.
*G06F 9/50* (2006.01)
*G06T 19/00* (2011.01)
(Continued)

(52) U.S. Cl.
CPC ............... *G06F 9/453* (2018.02); *G06T 7/73* (2017.01); *G06T 7/75* (2017.01); *G06T 19/006* (2013.01);
(Continued)

(58) Field of Classification Search
CPC ... G06F 9/453; G06T 7/73; G06T 7/75; G06T 19/006; G06T 7/74; G06V 20/20; G06V 20/41; G06V 20/48; G06V 20/49
See application file for complete search history.

(56) References Cited

U.S. PATENT DOCUMENTS

2015/0296250 A1* 10/2015 Casper ............... G06Q 30/0267
725/34
2018/0247023 A1 8/2018 Divine
(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.
(Continued)

*Primary Examiner* — Tapas Mazumder
(74) *Attorney, Agent, or Firm* — Rakesh Roy

(57) ABSTRACT

A method, computer system, and a computer program product for AR guidance is provided. The present invention may include detecting a plurality of objects in a video recording associated with completing a task. The present invention may include generating a plurality of three-dimensional (3D) object models based on scanning a plurality of real objects in a task space. The present invention may include matching the detected plurality of objects in the video recording with the generated plurality of 3D object models representing the plurality of real objects in the task space. The present invention may include generating, based on the video recording, an augmented reality (AR) guidance model for completing the task, wherein the generated AR guidance model replaces the detected plurality of objects in the video recording with the generated plurality of 3D object models representing the plurality of real objects in the task space.

11 Claims, 8 Drawing Sheets

(51) Int. Cl.
*G06F 9/451* (2018.01)
*G06T 7/73* (2017.01)
*G06V 20/40* (2022.01)
*G06V 20/20* (2022.01)

(52) U.S. Cl.
CPC .............. *G06V 20/20* (2022.01); *G06V 20/41* (2022.01); *G06V 20/48* (2022.01); *G06V 20/49* (2022.01); *G06T 7/74* (2017.01)

(56) References Cited

U.S. PATENT DOCUMENTS

| | | |
|---|---|---|
| 2018/0275848 A1 | 9/2018 | Tuukkanen |
| 2019/0056779 A1 | 2/2019 | Guven |
| 2019/0188499 A1* | 6/2019 | Hummelshøj ....... G05D 1/0246 |
| 2019/0378204 A1* | 12/2019 | Ayush ................ G06Q 30/0643 |
| 2019/0392650 A1 | 12/2019 | Holzer |
| 2020/0098173 A1* | 3/2020 | McCALL ............... G06F 3/011 |

OTHER PUBLICATIONS

Pending U.S. Appl. No. 17/333,442, filed May 28, 2021, entitled "Transforming Asset Operation Video to Augmented Reality Guidance Model", 39 pages.

U.S. Pending U.S. Appl. No. 17/333,442, entitled "Transforming Asset Operation Video to Augmented Reality Guidance Model", filed May 28, 2021, 39 Pages.

IBM, List of IBM Patents or Patent Applications Treated as Related, Appendix P, dated Nov. 7, 2022, 2 pages.

\* cited by examiner

TRANSFORMING ASSET OPERATION VIDEO TO AUGMENTED REALITY GUIDANCE MODEL

BACKGROUND

The present invention relates generally to the field of computing, and more particularly to augmented reality (AR) technologies.

In asset management scenarios, a technician may have to rely on text-based and/or video-based operation guides for installation, uninstallation, and maintenance procedures. However, in many instances, these text-based and video-based operation guides may be hard to follow along. For example, it may be difficult for a technician to identify an exact match between objects/tools called out in the operation guides and the objects/tools in the technician's work space. It may also be difficult for the technician to identify an exact location for a connection point between objects in the technician's work space based on the operation guides. It may further be difficult for the technician to verify the accuracy of a completed procedure and determine the cause of an error based on the operation guides.

SUMMARY

Embodiments of the present invention disclose a method, computer system, and a computer program product for AR guidance. The present invention may include detecting a plurality of objects in a video recording associated with completing a task. The present invention may include generating a plurality of three-dimensional (3D) object models based on scanning a plurality of real objects in a task space. The present invention may include matching the detected plurality of objects in the video recording with the generated plurality of 3D object models representing the plurality of real objects in the task space. The present invention may include generating, based on the video recording, an augmented reality (AR) guidance model for completing the task, wherein the generated AR guidance model replaces the detected plurality of objects in the video recording with the generated plurality of 3D object models representing the plurality of real objects in the task space.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
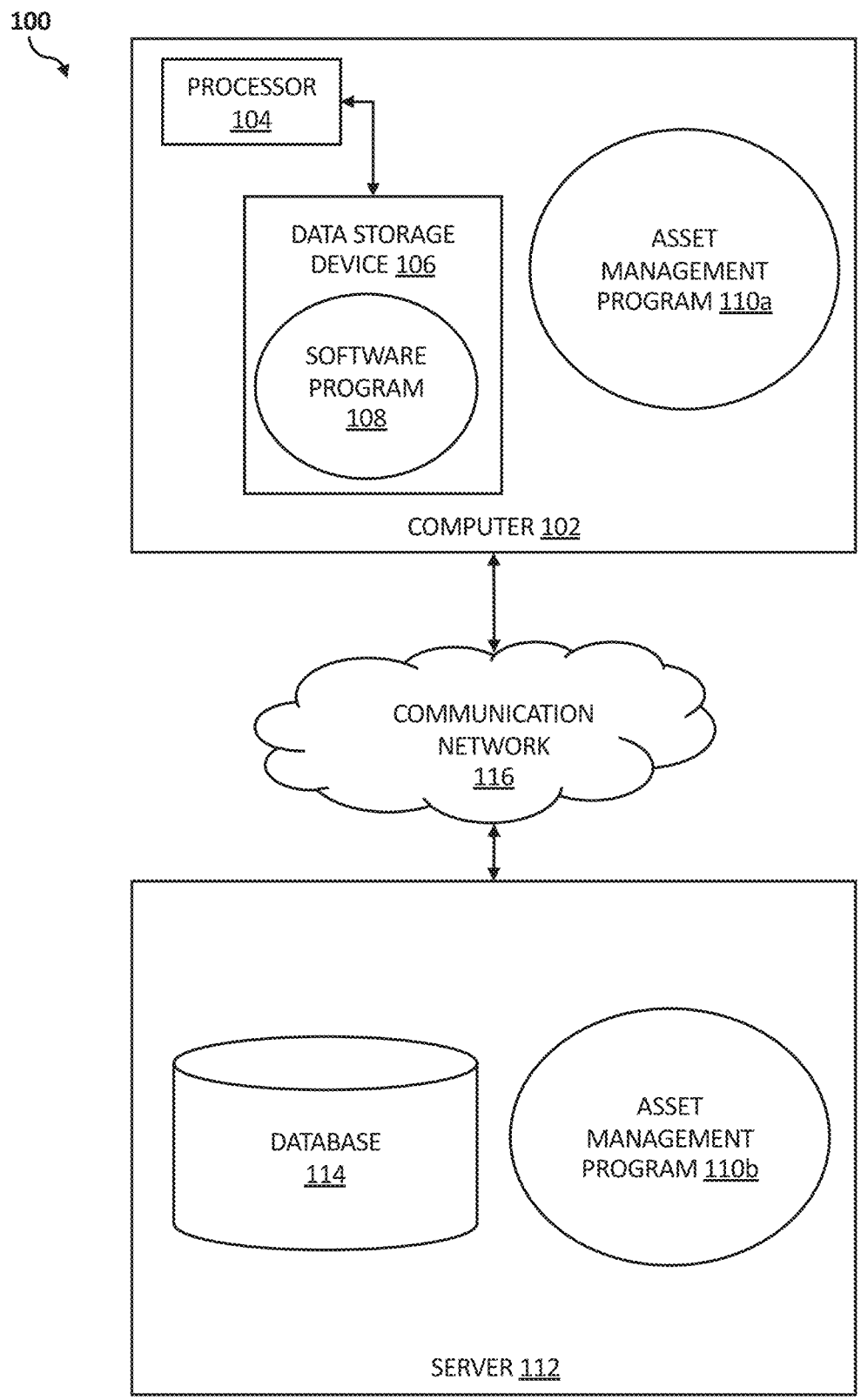
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for transforming asset operation videos into AR guidance models. As such, the present embodiment has the capacity to improve the technical field of asset management by implementing AR assisted guidance generated from an asset operation video, where objects detected in the video are matched with objects found in a real environment. More specifically, an asset management program may analyze a video to identify one or more objects, tools, and actions involved in each step of a procedure. Then, the asset management program may scan the objects and tools in a real environment (e.g., work or task space of a technician) using an AR enabled camera to generate three-dimensional (3D) models of the objects and tools scanned in real environment. Next, the asset management program may match the 3D models of the objects and tools with the objects and tools identified in the video to build a complete AR guidance model of the video. Thereafter, the asset management program may enable the AR guidance model to be applied to guide a user through installation, uninstallation, and/or maintenance steps. In one embodiment, the asset management program may enable recognizing objects and tools in the real environment as seen through an AR device (e.g., AR headset, AR glasses and/or AR enabled smart phone cameras) and displaying 3D markings (e.g., arrows, labels, or other annotations) associated with those objects and tools. In some embodiments, the asset management program may also illustrate and demonstrate the operation process via the AR device. In various embodiments, the asset management program may also enable checking the progress of a procedure and monitoring for potential sources of error in the procedure.

As described previously, in asset management scenarios, a technician may have to rely on text-based and/or video-based operation guides for installation, uninstallation, and maintenance procedures. However, in many instances, these text-based and video-based operation guides may be hard to follow along. For example, it may be difficult for a technician to identify an exact match between objects/tools called out in the operation guides and the objects/tools in the technician's work space. It may also be difficult for the technician to identify an exact location for a connection point between objects in the technician's work space based on the operation guides. It may further be difficult for the technician to verify the accuracy of a completed procedure and determine the cause of an error based on the operation guides.

Therefore, it may be advantageous to, among other things, provide a way to automatically transform a source video into an AR guidance model for asset management operations without requiring pre-define 3D models.

According to at least one embodiment, the asset management program may match objects and tools shown in a source video with real objects and tools scanned in a real environment. As noted above, the asset management program may not require pre-defined 3D models of the objects and tools and may instead generate these 3D models based on scanning the real environment.

According to one embodiment, if the source video includes multiple similar accessories (e.g., objects and/or tools), the asset management program may identify the correct accessory by analyzing the assembly relationships depicted in the source video and implementing AR measurement techniques to find the correct accessory based on related accessories.

According to one embodiment, the asset management program may identify and mark connection anchors on a 3D model, which may be used to mark the connection position on real objects. In some embodiments, the asset management program may compose an action-complete-model, which may be used to compare and judge an installation, uninstallation, and/or maintenance progress.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an asset management program 110a. The networked computer environment 100 may also include a server 112 that is enabled to run an asset management program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the asset management program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the asset management program 110a, 110b (respectively) to transform a source asset operation video into an AR guidance model for the asset operation procedure (e.g., task). Embodiments are explained in more detail below with respect to FIGS. 2 to 5.

Figure 2:
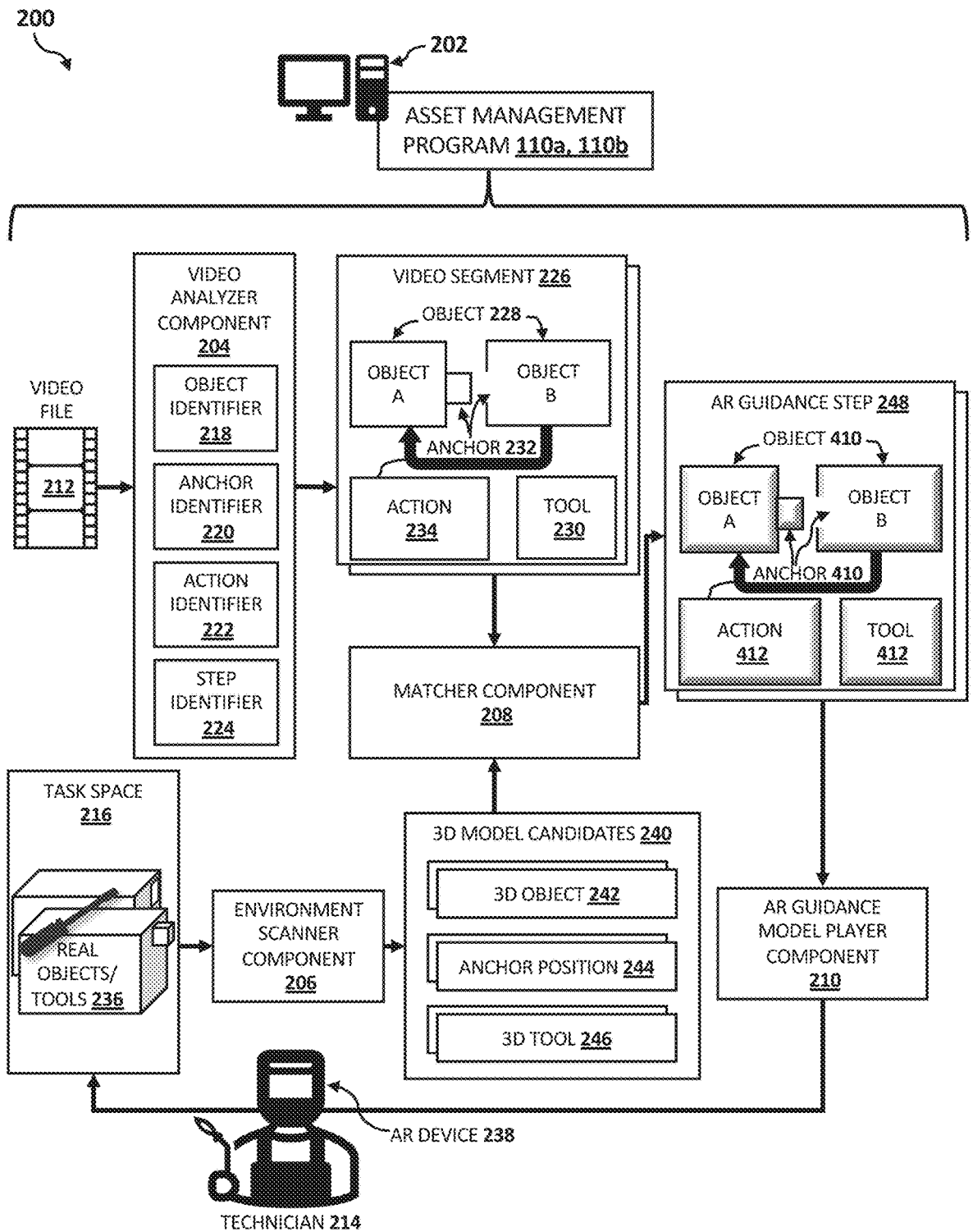
FIG. 2 is a schematic block diagram of a asset management environment according to at least one embodiment.

Referring now to FIG. 2, a schematic block diagram of an asset management environment 200 implementing an asset management process of the asset management program 110a, 110b according to at least one embodiment is depicted. According to one embodiment, the asset management environment 200 may include one or more components (e.g., client computer 102; server computer 112; communication network 116) of the computer environment 100 discussed above with reference to FIG. 1.

According to one embodiment, the asset management environment 200 may include a computer system 202 having a tangible storage device and a processor that is enabled to run the asset management program 110a, 110b. In one embodiment, the computer system 202 may include one or more client computers 102 and/or one or more server computers 112. In various embodiments, the client computer 102 and/or the server computer 112 of the computer system 202 may include a workstation, a personal computing device, a laptop computer, a desktop computer, a thin-client terminal, a tablet computer, a smartphone, a smart watch or other smart wearable device, or other electronic devices.

In one embodiment, the asset management program 110a, 110b may include a single computer program or multiple program modules or sets of instructions being executed by the processor of the computer system 202. The asset management program 110a, 110b may include routines, objects, components, units, logic, data structures, and actions that may perform particular tasks or implement particular abstract data types. The asset management program 110a, 110b may be practiced in distributed cloud computing environments where tasks may be performed by remote processing devices which may be linked through the communication network 116. In one embodiment, the asset management program 110a, 110b may include program instructions that may be collectively stored on one or more computer-readable storage media.

According to at least one embodiment, the asset management program 110a, 110b may generally include a video analyzer component 204, an environment scanner component 206, a matcher component 208, and an AR guidance model player component 210, as illustrated in FIG. 2.

According to one embodiment, the video analyzer component 204 may receive a video file 212 including a source video for constructing an AR guidance model. In one embodiment, the video file 212 may include a video recording of a subject matter expert (SME) performing an asset operation, such as, for example, an installation, uninstallation, repair, or other maintenance procedure which a technician 214 or other user may want to replicate in their task space 216.

In one embodiment, once the video file 212 is received by the video analyzer component 204, the video analyzer component 204 may scan the video file 212 using an object identifier 218, an anchor identifier 220, an action identifier 222, and a step identifier 224. In at least one embodiment, the step identifier 224 may be implemented to split or separate the video file 212 into multiple video segments 226. In one embodiment, the video segments 226 may represent one or more steps or processes of a procedure and may be determined based on analyzing image similarities in the video data. According to one embodiment, in each video segment 226 (e.g., step), the video analyzer component 204 may implement the object identifier 218 to identify one or more objects 228 (e.g., object A and object B) and/or one or more tools 230. Further, in each video segment 226, the video analyzer component 204 may implement the anchor identifier 220 to identify one or more anchors 232 (e.g., connection points between objects) associated with the respective objects 228 and may implement the action identifier 222 to identify one or more actions 234 (e.g., action with tools). In one embodiment, the anchors 232 may be further defined as a source anchor or a target anchor of a respective object 228 such that the action 234 may be described as a connection/disconnection between the source anchor and the target anchor. For example, in FIG. 2, the anchor 232 associated with object B may be referred to as the source anchor and the anchor 232 associated with object A may be referred to as the target anchor. In this example, the action 234 may be described as using tool 230 to connect the source anchor (e.g., anchor 232) of object B with the target anchor (e.g., anchor 232) of object A.

According to one embodiment, the objects 228, tools 230, anchors 232, and actions 234 associated with each video segment 226 may be described as two-dimensional (2D) image data. The video analyzer component 204 and video segment 226 will be further described with reference to FIG. 3.

According to one embodiment, the asset management program 110a, 110b may next scan one or more real objects and tools 236 in the task space 216 of the technician 214 using the environment scanner component 206. In one embodiment, the environment scanner component 206 may be implemented using an AR enabled camera, such as, for example, an AR device 238 associated with the technician 214. In one embodiment, the AR device 238 may include a head-mounted display in the form-factor of a pair of glasses or a headset, as shown in FIG. 2. In one embodiment, the technician 214 may use the one or more cameras in the AR device 238 to scan the real objects and tools 236 in their task space 216. In one embodiment, the environment scanner component 206 may receive multiple scans or images from the task space 216 and fuse the images into 3D model candidates 240. According to one embodiment, the 3D model candidates 240 may include one or more 3D objects 242, their respective anchor positions 244, and one or more 3D tools 246 representing the real objects and tool 236 found in the task space 216.

According to one embodiment, the asset management program 110a, 110b may then implement the matcher component 208 to match the objects 228, tools 230, and anchors 232 retrieved from the video segments 226 with the 3D model candidates 240. In one embodiment, the matcher component 208 may add 3D data from the 3D model candidates 240 into each video segment 226 to generate an AR guidance step 248 corresponding to each video segment 226. The matcher component 208 will be further described with reference to FIG. 4.

According to one embodiment, the AR guidance step 248 may include one or more objects 250 (e.g., object A and object B) corresponding to objects 228 in the corresponding video segment 226. Similarly, the AR guidance step 248 may include one or more anchors 252, tools 254, and actions 256 corresponding to anchors 232, the tools 230, and actions 234 associated with each video segment 226. However, unlike the 2D image data found in the corresponding video segment 226, the AR guidance step 248 may include 3D model data for the objects 250, anchors 252, tools 254, and actions 256. Further, the 3D model data associated with the actions 256 may contain information illustrating assembly of the objects 250 using the anchor positions 234 (e.g., connection points in the 3D objects). The AR guidance step 248 will be further described with reference to FIG. 5.

According to one embodiment, the asset management program 110a, 110b may then implement the AR guidance model player component 210 to display the AR guidance steps 248 via the AR device 238 to the technician 214. In one embodiment, the AR guidance model player component 210 may organize the AR guidance steps 248 in sequence such that the technician 214 may only move onto a next step after completing a current step. In other embodiments, the AR guidance model player component 210 may organize and display multiple AR guidance steps 248 in parallel. In some embodiments, the AR guidance model player component 210 may also display optional AR guidance steps 248.

In one embodiment, the AR guidance model player component 210 may display (e.g., via the AR device 238) AR annotations for the objects and tools required for each action 412 in the AR guidance step 248. In one embodiment, the AR guidance model player component 210 may demonstrate the action 412 via the AR device 238 based on the anchor positions 244 for each object. In one embodiment, the AR guidance model player component 210 may monitor and check the progress of each AR guidance step 248 by comparing the real progress of the assembly in the task space 216 with an action complete model for each step. According to one embodiment, the AR guidance model player component 210 may also enable verifying the accuracy of a completed assembly or procedure and identify causes of potential errors.

Figure 3:
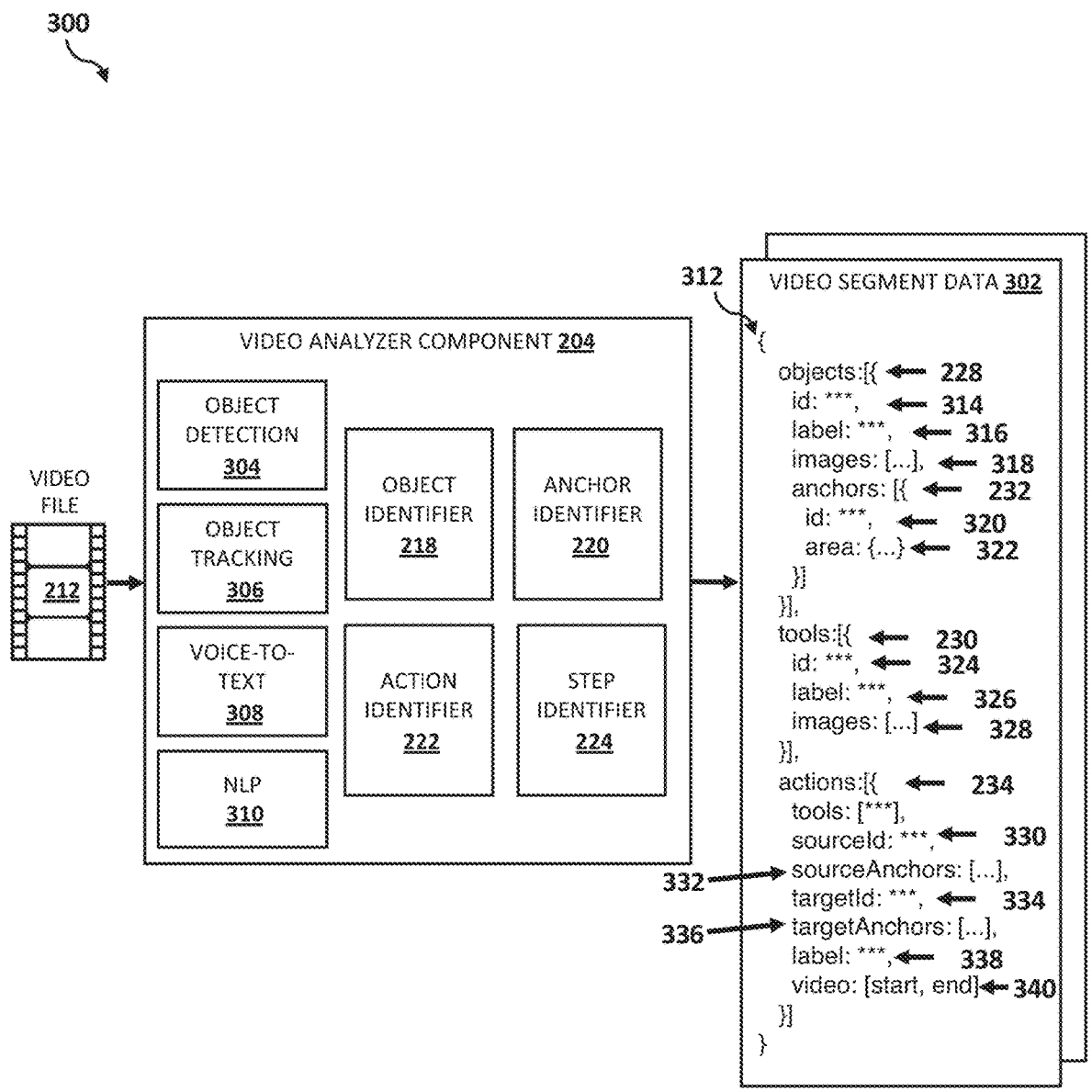
FIG. 3 is a schematic block diagram of a video segmentation process according to at least one embodiment.

Referring now to FIG. 3, a schematic block diagram of a video segmentation process 300 of the asset management program 110a, 110b according to at least one embodiment is depicted.

According to at least one embodiment, the video segmentation process 300 may be implemented by the video analyzer component 204, as described with reference to FIG. 2. In one embodiment, the video analyzer component 204 may receive a video file 212 (e.g., video recording of an SME performing task) and output a video segment data 302 corresponding to each video segment 226, as described with reference to FIG. 2. In some embodiments, the video analyzer component 204 may output multiple video segment data 302 corresponding to multiple video segments 226.

As described previously with reference to FIG. 2, the video analyzer component 204 may include an object identifier 218, an anchor identifier 220, an action identifier 222, and a step identifier 224. These modules may be enabled using technologies, such as, for example, object detection 304, object tracking 306, voice-to-text 308, and natural language processing (NLP) 310.

In one embodiment, object detection 304 may use computer vision and image processing to detect specific objects within an image based on features that help to classify the objects. For example, object detection 304 may be used to determine what objects/tools are being used in each video segment 226. In one embodiment, object tracking 306 may use computer vision and machine learning to locate an object is successive frames of a video. For example, object tracking 306 may be used to determine how the objects/tool are being moved during the assembly/procedure in each video segment 226. In one embodiment, voice-to-text 308 may use speech recognition capabilities to capture and understand the words spoken in the video recording on the video file 212 and output the spoken words into text. In one embodiment, NLP 310 may use machine learning to process and understand human language (e.g., including intent and sentiment) in the form of text or voice data. For example, the voice-to-text 308 and the NLP 310 may be used to process and understand the instructions spoken by the SME in the video recording.

According to one embodiment, the object detection 304, object tracking 306, voice-to-text 308, and NLP 310 technologies may be used to generate the video segment data 302 for each step described/illustrated in the video file 212. As shown in FIG. 3, the video segment data 302 may include one or more video segment code snippets 312 (e.g., pseudo code) describing the objects 228, anchors 232, tools 230, and actions 234 described with reference to FIG. 2.

According to one embodiment, the objects 228 detected in each video segment 226 may be described in the video segment code snippet 312 (of video segment data 302) using a unique object identifier 314, a natural language object label 316 (e.g., based on a description by the speaker in the video), and one or more 2D images 318.

In one embodiment, the anchors 232 associated with each object 228 may be described in the video segment code snippet 312 using a unique anchor identifier 320 and an anchor image area 322 corresponding to the 2D images 318 of associated object 228. In one embodiment, the anchor image area 322 may be described using image pixels of the 2D images 318 corresponding to the objects 228.

According to one embodiment, the tools 230 may be described in the video segment code snippet 312 in a manner similar to the objects 228. That is, each tool 230 may include a unique tool identifier 324, a natural language tool label 326 (e.g., based on a description by the speaker in the video), and one or more 2D tool images 328.

According to one embodiment, the actions 234 detected in each video segment 226 may be described in the video segment code snippet 312 using the tools (e.g., tool 230) needed for the action, a source object 330 (e.g., "sourceId"), one or more source object anchors 332 (e.g., "sourceAnchors"), a target object 334 (e.g., "targetId"), one or more target object anchors 336 (e.g., "targetAnchors"), a natural language action label 338 (e.g., based on a description by the speaker in the video), and an action video clip 340 indicating a start time and end time for a video clip depicting the corresponding action 234 in the video file 212.

Figure 4:
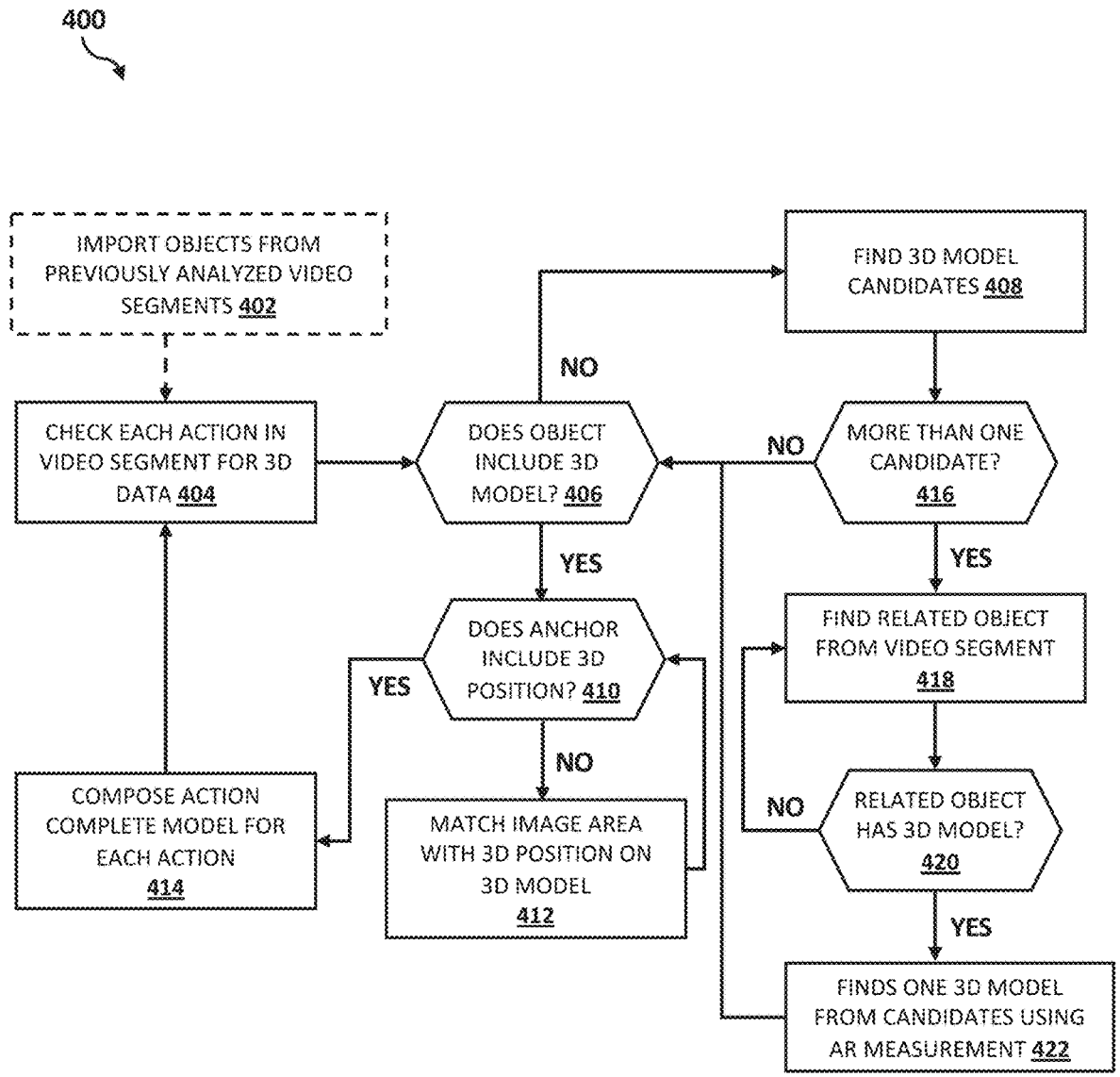
FIG. 4 is a schematic block diagram of an object matching process according to at least one embodiment.

Referring now to FIG. 4, a schematic block diagram of an object matching process 400 of the asset management program 110a, 110b according to at least one embodiment is depicted.

According to one embodiment, the object matching process 400 may be implemented by the matcher component 208 (FIG. 2) to supplement the 2D image data in the video segment data 302 with 3D model data generated by the environment scanner component 206. According to one embodiment, although object matching process 400 is described as matching 2D image data of an object with its corresponding 3D model data, the object matching process 400 may also be implemented to match 2D image data of a tool with its corresponding 3D model data.

At 402, objects from previously analyzed video segments are imported. According to one embodiment the asset management program 110a, 110b may implement the object matching process 400 to supplement the 2D image data in each video segment with 3D model data. Process 402 is illustrated using dotted lines because it may be skipped when processing the first video segment and may be implemented once at least one video segment has already been processed to include 3D model data for one or more of its objects. It is contemplated that if an object already includes 3D model data from a previously analyzed video segment, the asset management program 110a, 110b may copy the 3D model data over to another video segment including the same object.

At 404, each action in a video segment is checked for 3D data. According to one embodiment, the asset management program 110a, 110b may analyze the video segment data (e.g., scan the video segment code snippet 312) to determine whether the objects and tools associated with each action includes 2D image data or 3D model data.

Then at 406, the asset management program 110a, 110b determines if an object includes a 3D model. According to one embodiment, the asset management program 110a, 110b determines (based on the check at 404) if the one or more objects in each action includes 3D model data. If at 406, the asset management program 110a, 110b determines that the object does not include 3D model data, then at 408 (i.e., "no" branch), the asset management program 110a, 110b finds a 3D model candidate for the object. In one embodiment, the asset management program 110a, 110b may select the 3D model candidate for the object from the set of 3D model candidates generated by the environment scanner component 206 (FIG. 2).

However, if at 406, the asset management program 110a, 110b determines that the object does include 3D model data, then at 410 (i.e., "yes" branch), the asset management program 110a, 110b determines whether an anchor associated with the object includes a 3D position. If at 410, the asset management program 110a, 110b determines that the anchor does not include a 3D position, then at 412 (i.e., "no" branch), the asset management program 110a, 110b matches an image area with a 3D position on 3D model. As described previously, the anchor may be described in the video segment code snippet 312 as an image area (e.g., image pixels) on one or more 2D images of a corresponding object. In one embodiment, the asset management program 110a, 110b may convert the image area of the object associated with the anchor into a 3D position (e.g., using x, y, z coordinates) on a 3D model of the object. However, if at 410, the asset management program 110a, 110b determines that the anchor does include a 3D position, then at 414 (i.e., "yes" branch), the asset management program 110a, 110b composes a complete model for each action. According to one embodiment, the complete model for each action may include a 3D model of what the 3D objects look like once they have been assembled or disassembled after each step. In various embodiments, the complete model may also indicate the connection or disconnection between the various anchors after each step.

Returning to 408, the asset management program 110a, 110b may identify a 3D model candidate for an object without 3D model data. Then at 416, the asset management program 110a, 110b determines if there is more than one viable candidate among the 3D model candidates for the object. If at 416, the asset management program 110a, 110b determines that there is only one viable candidate among the 3D model candidates for the object (i.e., "no" branch) then the process may return to 406 as having found a 3D model match for a given object.

However, if at 416, the asset management program 110a, 110b determines that there is more than one viable candidate, then at 418 (i.e., "yes" branch), the asset management program 110a, 110b finds one or more related objects from the video segment. According to one embodiment, the asset management program 110a, 110b may identify one or more related objects from the video segment code snippet 312. In one embodiment, the related object may include an object that is connected to the object having more than one 3D model candidates. In one embodiment, if the object having more than one 3D model candidates is the source object (e.g., "sourceId" in the video segment code snippet 312), the related object may include the target object (e.g., "targetId" the video segment code snippet 312) that may be connected to the source object.

According to one embodiment, once the asset management program 110a, 110b identifies one or more related objects, then at 420, the asset management program 110a, 110b determines whether the related objects include 3D model data. If at 420, the asset management program 110a, 110b determines that a related object does not include 3D model data (i.e., "no" branch), then the asset management program 110a, 110b may return to 418 to find another related object from the video segment.

However, if at 420, the asset management program 110a, 110b determines that a related object includes 3D model data, then at 422 (i.e., "yes" branch), the asset management program 110a, 110b finds one 3D model from the multiple candidates using AR measurements. According to one embodiment, the asset management program 110a, 110b may measure one or more features (e.g., dimension of anchor) of the 3D model of the related object and the multiple 3D model candidates to identify which 3D model from the multiple candidates would fit the related object once the objects are assembled. For example, if there are multiple 3D model candidates for object A, the asset management program 110a, 110b may implement AR measurements to measure the length and anchor dimensions of a 3D model of related object B. Then, the asset management program 110a, 110b may implement AR measures to measure the length and anchor dimensions of the multiple 3D candidates for object A and identify the specific 3D model that may fit (e.g., for proper assembly) with the 3D model of the related object B.

Figure 5:
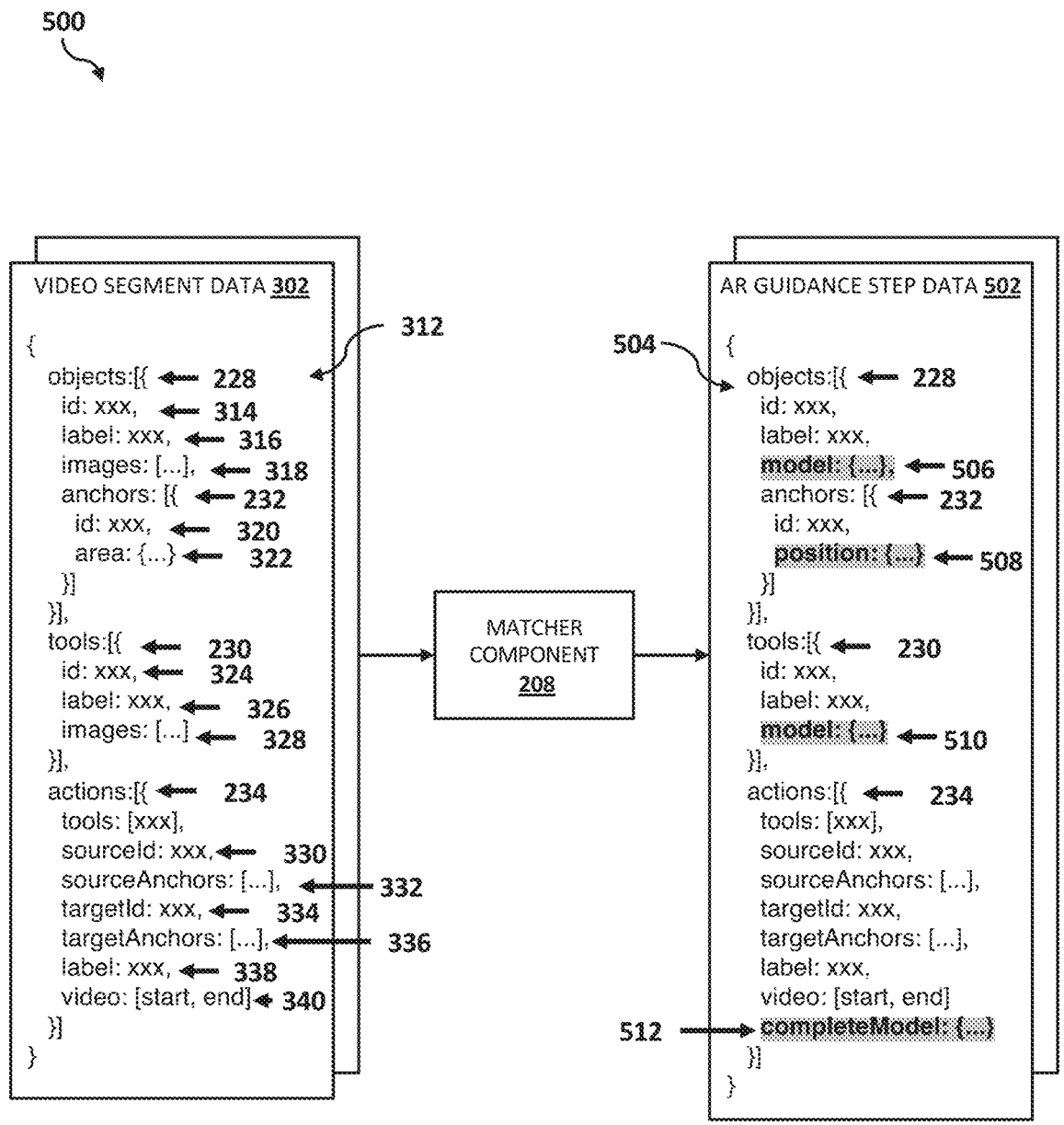
FIG. 5 is a schematic block diagram of an output of the object matching process depicted in FIG. 4 according to at least one embodiment.

Referring now to FIG. 5, a schematic block diagram 500 of an output of the object matching process 400 of the asset management program 110a, 110b according to at least one embodiment is depicted.

According to one embodiment, the matcher component 208 may receive the video segment data 302 (e.g., including the video segment code snippets 312 described with reference to FIG. 3) and output (e.g., via object matching process 400) an AR guidance step data 502 corresponding to each video segment. In one embodiment, the AR guidance step data 502 may include one or more AR guidance code snippets 504 (e.g., pseudo code) describing the objects 228, anchors 232, tools 230, and actions 234 detailed with reference to FIG. 2.

According to one embodiment, although the AR guidance code snippets 504 may include one or more portions that may be similar to the video segment code snippets 312, the AR guidance step data 502 may be different from the video segment data 302 in that the 2D image data in the video segment data 302 may be supplemented with 3D model data in the AR guidance step data 502.

More specifically, the one or more 2D object images 318 corresponding to object 228 may be replaced with a 3D object model 506 corresponding to the object 228. Similarly, the anchor image area 322 corresponding the 2D images 318 of associated object 228 may be replaced with a 3D anchor position 508 (e.g., 3D position on 3D model). Further, the one or more 2D tool images 328 corresponding to tool 230 may be replaced with a 3D tool model 510 corresponding to the tool 230. In addition, the AR guidance step data 502 may also include a 3D action complete model 512 for each action 234. According to one embodiment, 3D action complete model 512 may illustrate an assembly or disassembly of the objects 228 after each step using 3D object models 506. In at least one embodiment, after each step of a task, the asset management program 110a, 110b may compare the real progress in the task space 216 of the technician 214 (FIG. 2) with the corresponding 3D action complete model 512 to determine whether the step or action is completed accurately in the task space 216.

According to one embodiment, the 3D object model 506, the 3D anchor position 508, the 3D tool model, and the 3D action complete model 512 described above may be generated by the matcher component 208 of the asset management program 110a, 110b using the object matching process 400 (FIG. 4).

Accordingly, the asset management program 110a, 110b may improve the functionality of a computer because the asset management program 110a, 110b may enable a computer to extract one or more actions with assembled objects and their corresponding anchors from a video recording based on object detection/correlation. The asset management program 110a, 110b may also enable a computer to generate an AR guidance model by matching objects in the video recording with 3D object models created by scanning real objects in a work/task space. The asset management program 110a, 110b may also enable a computer to select an exact 3D object model from similar candidates based on AR measurements and assembly relation with related 3D object models. The asset management program 110a, 110b may also enable a computer to generate an action complete model for each step by composing one or more 3D object models with their corresponding anchors. The asset management program 110a, 110b may also enable a computer to find objects in the task space, monitor task progress, and detect errors in the task when displaying the AR guidance model/session via an AR device.

It may be appreciated that FIGS. 2 to 5 provide only an illustration of one embodiment and do not imply any limitations with regard to how different embodiments may be implemented. Many modifications to the depicted embodiment(s) may be made based on design and implementation requirements.

Figure 6:
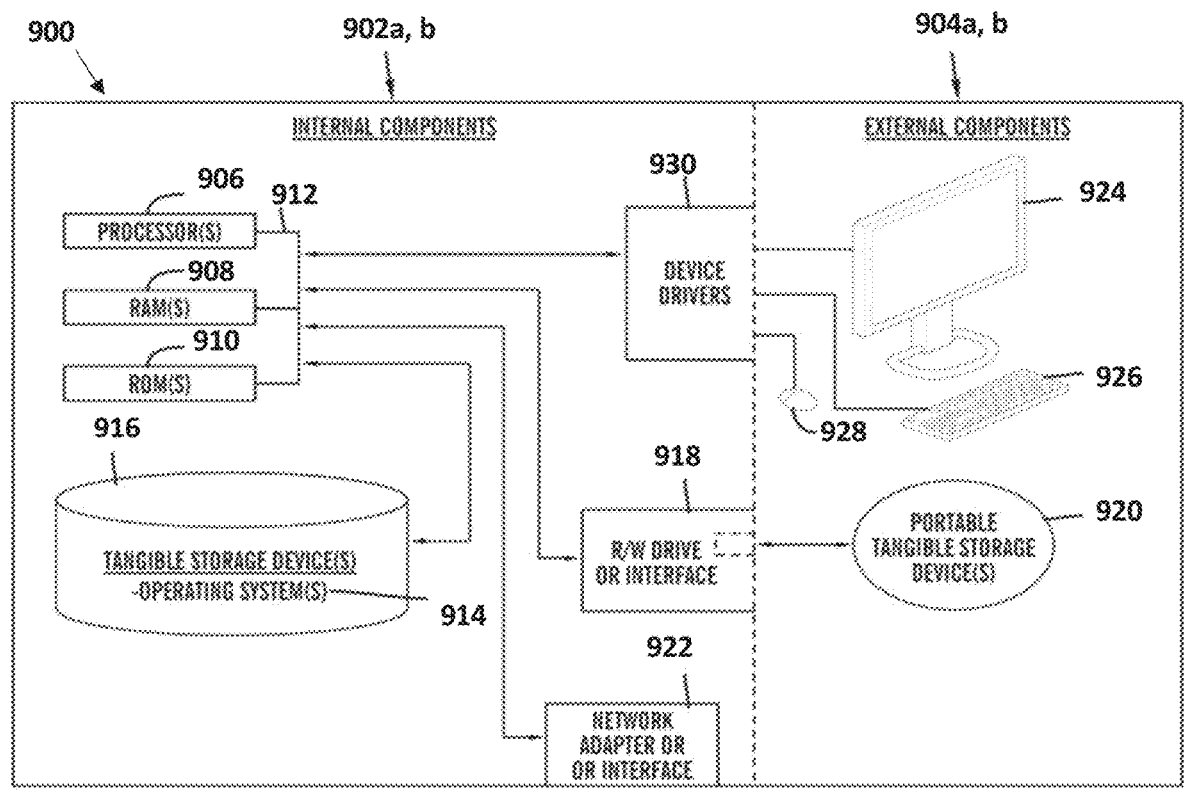
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 6. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the asset management program 110a in client computer 102, and the asset management program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the asset management program 110a and 110b can be stored on one or more of the respective portable computer-readable tangible storage devices 920, read via the respective RAY drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the asset management program 110a in client computer 102 and the asset management program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the asset management program 110a in client computer 102 and the asset management program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices.

Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
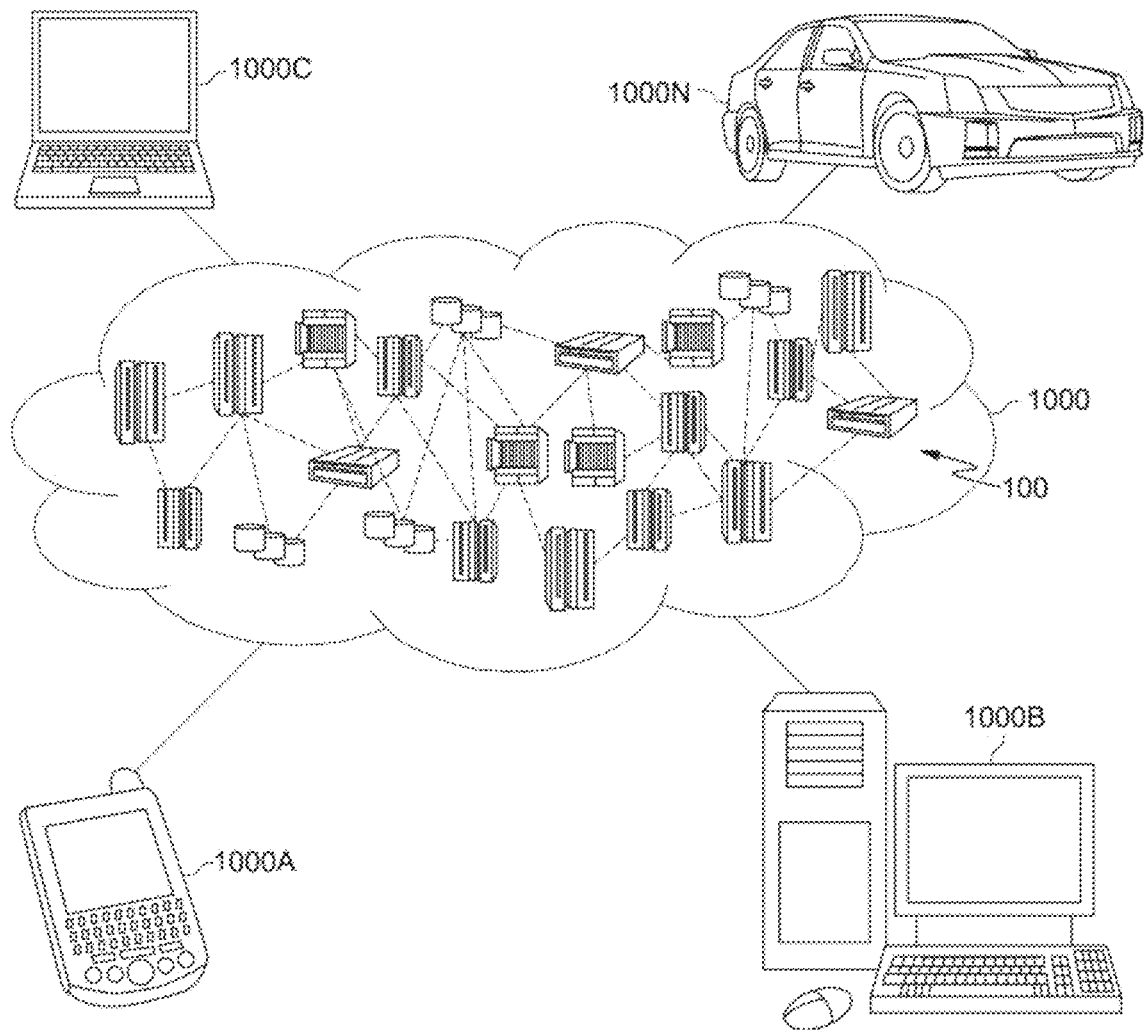
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
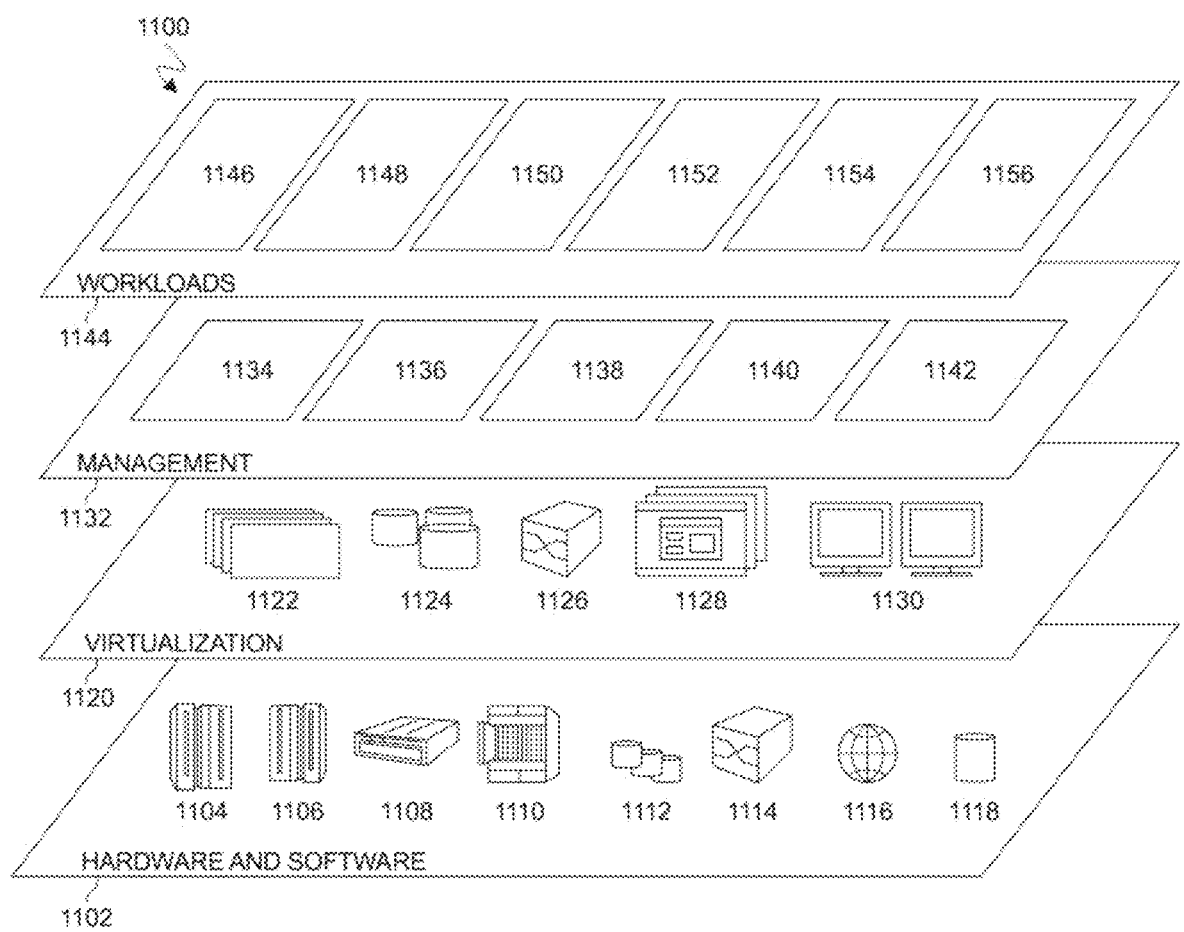
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and asset management 1156. An asset management program 110a, 110b provides a way to transform a source asset operation video into an AR guidance model for the asset operation procedure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting a plurality of objects in a video recording associated with completing a task;
   generating a plurality of three-dimensional (3D) object models based on scanning a plurality of real objects in a task space;
   separating the video recording into a plurality of video segments corresponding to a plurality of steps for completing the task;

identifying, in each video segment of the plurality of video segments, at least one action for completing a respective step;

matching the detected plurality of objects in the video recording with the generated plurality of 3D object models representing the plurality of real objects in the task space; and generating, based on the video recording, an augmented reality (AR) guidance model for completing the task, wherein the generated AR guidance model replaces the detected plurality of objects in the video recording with the generated plurality of 3D object models representing the plurality of real objects in the task space.

2. The method of claim 1, further comprising:
composing, for the identified at least one action, a 3D action complete model representing an assembly of the generated plurality of 3D object models after completing the respective step.

3. The method of claim 2, further comprising:
displaying the generated AR guidance model corresponding to the video recording using an AR device;
marking, in the displayed AR guidance model, at least one real object in the task space corresponding to the at least one action for completing the respective step; and
demonstrating, in the displayed AR guidance model, the at least one action for completing the respective step corresponding to the video recording.

4. The method of claim 3, further comprising:
determining a progress of the task based on comparing the generated AR guidance model with a real progress in the task space.

5. A computer system for AR guidance, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

detecting a plurality of objects in a video recording associated with completing a task;

generating a plurality of three-dimensional (3D) object models based on scanning a plurality of real objects in a task space;

separating the video recording into a plurality of video segments corresponding to a plurality of steps for completing the task;

identifying, in each video segment of the plurality of video segments, at least one action for completing a respective step;

matching the detected plurality of objects in the video recording with the generated plurality of 3D object models representing the plurality of real objects in the task space; and generating, based on the video recording, an augmented reality (AR) guidance model for completing the task, wherein the generated AR guidance model replaces the detected plurality of objects in the video recording with the generated plurality of 3D object models representing the plurality of real objects in the task space.

6. The computer system of claim 5, further comprising:
composing, for the identified at least one action, a 3D action complete model representing an assembly of the generated plurality of 3D object models after completing the respective step.

7. The computer system of claim 6, further comprising:
displaying the generated AR guidance model corresponding to the video recording using an AR device;
marking, in the displayed AR guidance model, at least one real object in the task space corresponding to the at least one action for completing the respective step; and
demonstrating, in the displayed AR guidance model, the at least one action for completing the respective step corresponding to the video recording.

8. The computer system of claim 7, further comprising:
determining a progress of the task based on comparing the generated AR guidance model with a real progress in the task space.

9. A computer program product for AR guidance, comprising:
one or more computer-readable storage media and program instructions collectively stored on the one or more computer-readable storage media, the program instructions executable by a processor to cause the processor to perform a method comprising:

detecting a plurality of objects in a video recording associated with completing a task;

generating a plurality of three-dimensional (3D) object models based on scanning a plurality of real objects in a task space;

separating the video recording into a plurality of video segments corresponding to a plurality of steps for completing the task;

identifying, in each video segment of the plurality of video segments, at least one action for completing a respective step;

matching the detected plurality of objects in the video recording with the generated plurality of 3D object models representing the plurality of real objects in the task space; and generating, based on the video recording, an augmented reality (AR) guidance model for completing the task, wherein the generated AR guidance model replaces the detected plurality of objects in the video recording with the generated plurality of 3D object models representing the plurality of real objects in the task space.

10. The computer program product of claim 9, further comprising:
composing, for the identified at least one action, a 3D action complete model representing an assembly of the generated plurality of 3D object models after completing the respective step.

11. The computer program product of claim 10, further comprising:
displaying the generated AR guidance model corresponding to the video recording using an AR device;
marking, in the displayed AR guidance model, at least one real object in the task space corresponding to the at least one action for completing the respective step; and
demonstrating, in the displayed AR guidance model, the at least one action for completing the respective step corresponding to the video recording.

* * * * *